US009469788B2

(12) United States Patent
Schuhmann et al.

(10) Patent No.: US 9,469,788 B2
(45) Date of Patent: Oct. 18, 2016

(54) PREDOMINANTLY BIODEGRADABLE RELEASE FILM

(75) Inventors: Michael Schuhmann, Grosshabersdorf (DE); Kurt Stark, Neuhaus (DE); Stefan Sitzmann, Kichehrenbach (DE)

(73) Assignee: COMMERZBANK INTERNATIONAL S.A., AS SECURITY AGENT, Luxembourg (LU)

( * ) Notice: Subject to any disclaimer, the term of this patent is extended or adjusted under 35 U.S.C. 154(b) by 82 days.

(21) Appl. No.: 13/424,556

(22) Filed: Mar. 20, 2012

(65) Prior Publication Data

US 2012/0213959 A1 Aug. 23, 2012

Related U.S. Application Data

(63) Continuation of application No. PCT/EP2010/005750, filed on Sep. 20, 2010.

(30) Foreign Application Priority Data

Sep. 21, 2009 (DE) .................... 10 2009 042 008

(51) Int. Cl.

| | |
|---|---|
| C09J 7/02 | (2006.01) |
| C08L 31/04 | (2006.01) |
| C09D 143/04 | (2006.01) |
| B32B 5/14 | (2006.01) |
| B32B 9/02 | (2006.01) |
| B32B 9/04 | (2006.01) |
| B32B 9/06 | (2006.01) |
| B32B 23/06 | (2006.01) |
| B32B 23/08 | (2006.01) |
| B32B 27/08 | (2006.01) |
| B32B 27/10 | (2006.01) |
| B32B 27/16 | (2006.01) |
| B32B 27/18 | (2006.01) |
| B32B 27/30 | (2006.01) |
| B32B 27/32 | (2006.01) |
| B32B 27/36 | (2006.01) |
| C08K 5/00 | (2006.01) |
| C08L 83/00 | (2006.01) |

(52) U.S. Cl.
CPC .............. *C09J 7/0228* (2013.01); *B32B 5/147* (2013.01); *B32B 9/02* (2013.01); *B32B 9/045* (2013.01); *B32B 9/06* (2013.01); *B32B 23/06* (2013.01); *B32B 23/08* (2013.01); *B32B 27/08* (2013.01); *B32B 27/10* (2013.01); *B32B 27/16* (2013.01); *B32B 27/18* (2013.01); *B32B 27/306* (2013.01); *B32B 27/32* (2013.01); *B32B 27/36* (2013.01); *C08L 31/04* (2013.01); *C09D 143/04* (2013.01); *B32B 2255/00* (2013.01); *B32B 2255/10* (2013.01); *B32B 2255/12* (2013.01); *B32B 2255/26* (2013.01); *B32B 2270/00* (2013.01); *B32B 2307/7163* (2013.01); *B32B 2307/748* (2013.01); *B32B 2307/75* (2013.01); *B32B 2405/00* (2013.01); *B32B 2419/06* (2013.01); *B32B 2439/70* (2013.01); *B32B 2553/00* (2013.01); *B32B 2555/00* (2013.01); *B32B 2555/02* (2013.01); *B32B 2556/00* (2013.01); *C08K 5/0025* (2013.01); *C08L 83/00* (2013.01); *C09J 2401/005* (2013.01); *C09J 2403/005* (2013.01); *C09J 2467/005* (2013.01); *C09J 2483/005* (2013.01); *Y10T 428/1476* (2015.01); *Y10T 428/31663* (2015.04)

(58) Field of Classification Search
CPC .............. C09J 7/0228; C09J 2401/005; C09J 2403/005; C09J 2467/005; C09J 2483/005; Y10T 428/1476
See application file for complete search history.

(56) References Cited

U.S. PATENT DOCUMENTS

| | | | |
|---|---|---|---|
| 3,427,270 A | 2/1969 | Northrup et al. | |
| 5,425,991 A | 6/1995 | Lu | |
| 5,585,201 A * | 12/1996 | Ha ............................... | 428/64.4 |
| 5,658,646 A * | 8/1997 | Takano et al. ............. | 428/195.1 |
| 5,932,352 A | 8/1999 | Higgins | |
| 5,942,591 A | 8/1999 | Itoh et al. | |
| 6,530,910 B1 * | 3/2003 | Pomplun et al. ............. | 604/364 |

(Continued)

FOREIGN PATENT DOCUMENTS

| | | |
|---|---|---|
| CN | 101 134 875 A | 3/2008 |
| DE | 16 96 182 A1 | 10/1971 |

(Continued)

OTHER PUBLICATIONS

Full translation of CN 101134875A (2008).*

(Continued)

*Primary Examiner* — Scott R Walshon
(74) *Attorney, Agent, or Firm* — Norris McLaughlin & Marcus P.A.

(57) ABSTRACT

The present invention relates to a predominantly biodegradable double-separating film and comprising at least one carrier layer (a) that is based on at least one biodegradable polymer, and at least one release layer (b) that is based on at least one cured polysiloxane. The curing of said release layer is based, at least partially, on at least one cross-linked monomer or oligomer additive. Said additive also promotes adhesion between the carrier layer (a) and the release layer (b), and has no siloxane groups but does have at least two functional groups, of which at least one is a functional group with at least one carbon double bond. No adhesion-promoting layer is present between the carrier layer (a) and the release layer (b). In addition the invention relates to the use of such a separating film as a removable protection and cover film.

18 Claims, No Drawings

(56) References Cited

U.S. PATENT DOCUMENTS

| | | |
|---|---|---|
| 2004/0067331 A1 | 4/2004 | Kuckertz et al. |
| 2008/0147034 A1 | 6/2008 | Wang et al. |

FOREIGN PATENT DOCUMENTS

| | | | |
|---|---|---|---|
| DE | 10 05 4277 A1 | | 5/2002 |
| EP | 0 536 766 A2 | | 4/1993 |
| EP | 0 637 618 A1 | | 2/1995 |
| EP | 1 734 093 A1 | | 12/2006 |
| JP | 2000 056734 A | | 2/2000 |
| JP | 2000 289170 A | | 10/2000 |
| JP | 2001225416 A | * | 8/2001 |
| JP | 2002120210 A | * | 4/2002 |

OTHER PUBLICATIONS

International Search Report dated Jan. 18, 2011, mailed Jan. 28, 2011.

Database WPI 200882, An 2008-O01968, machine translation of CN101134875 dated Jul. 10, 2014.

* cited by examiner

US 9,469,788 B2

PREDOMINANTLY BIODEGRADABLE RELEASE FILM

This application is a Continuation of PCT/EP2010/005750 filed Sep. 20, 2010, which claims priority to Germany application 10 2009 042 088.8 filed Sep. 21, 2009.

The present invention relates to an at least two-layer, predominantly biodegradable release film comprising at least one backing layer (a) based on at least one biodegradable polymer, and at least one release layer (b) based on at least one cured polysiloxane whose curing derives at least partly from at least one crosslinking monomeric or oligomeric additive that also promotes adhesion between the backing layer (a) and the release layer (b), that has no siloxane groups but does have at least two functional groups, of which at least one is a functional group containing at least one carbon double bond, there being no adhesion promoter layer between the backing layer (a) and the release layer (b), and also to a use of such a release film as a detachable protective and liner film.

BACKGROUND OF THE INVENTION

Release films with backing layers made of thermoplastics such as polyolefins, polyesters or polyamides and having a release layer based on a polysiloxane are widely used as protective films for adhesive tapes or self-adhesive labels, in order, for example, to prevent these single- or double-sidedly adhesive products from sticking during storage. Release films of these kinds are distinguished by a good release effect toward adhesives such as pressure-sensitive adhesives, for example, or other adhesive materials and also by good adhesion between the release layer and the backing layer. The adhesion of the release layer to the backing layer prevents at least partial, uncontrolled detachment (rub-off) of the release layer from the backing layer prior to the actual application.

A disadvantage of such release films, however, is that their backing layers are not biodegradable.

From both an environmental and an economic standpoint, however, it is desirable that at least the backing layers of such release films are produced from biodegradable materials, in order to ensure ultimate disposal of these materials by means of composting, for example, following controlled removal of the release layer.

There is therefore a need for predominantly biodegradable release films which in terms of their release effect meet the aforementioned requirements imposed on conventional release films, made from nonbiodegradable materials, and which, furthermore, also exhibit very good adhesion between backing layer and release layer.

It was an object of the present invention, therefore, to provide a release film which is predominantly—that is, more than 50%—biodegradable and which is distinguished by a very good release effect toward adhesives and adhesive materials in conjunction with excellent adhesion between the release layer and the backing layer without an adhesion promoter layer.

SUMMARY OF THE INVENTION

This object is achieved through the provision of an at least two-layer, predominantly biodegradable release film comprising at least one backing layer (a) based on at least one biodegradable polymer, and at least one release layer (b) based on at least one cured polysiloxane whose curing derives at least partly from at least one crosslinking monomeric or oligomeric additive, with the promotion of adhesion between the backing layer (a) and the release layer (b) being brought about as well, there being, in other words, no separate adhesion promoter layer between the backing layer (a) and the release layer (b), and the additive used contains no siloxane groups, and the additive used contains at least two functional groups, of which at least one is a functional group containing at least one carbon double bond.

DETAILED DESCRIPTION

The term "biodegradable" for the purposes of the present invention means that a natural, semisynthetic or synthetic polymer in any of a variety of forms, such as, for example, as a layer of a release film, can be decomposed on exposure to microorganisms and/or enzymes, to form water, carbon dioxide, and biomass, in accordance with DIN EN 13432, and in the disintegration test, in aerobic composting, after 12 weeks a biological degradation to an extent of at least 90%, preferably at least 95%, more preferably 99% is achieved.

The biodegradable layer of the detachable release film of the invention is at least one backing layer (a), and the nonbiodegradable component is at least one release layer (b). Since the backing layer (a) constitutes the main component of the release film in comparison to the release layer (b), the release film of the invention can be referred to overall as being predominantly biodegradable.

"Biodegradable polymers" in the sense of the present invention are natural, produced preferably from renewable raw materials, or semisynthetic or synthetic polymers.

Suitability for producing the backing layer (a) of the release film of the invention is possessed by at least one biodegradable polymer selected from the group comprising lactic acid homopolymers and copolymers, preferably polylactides, more preferably DL-lactide, L-lactide, and D-lactide, polyhydroxyalkanoates, cellulose, cellulose derivatives, thermoplastic starch, polyester, preferably polycaprolactones, at least partly hydrolyzed polyvinyl acetates, ethylene-vinyl alcohol copolymers, copolymers of at least two monomoners of the stated polymers, and mixtures of at least two of the stated polymers.

As polyesters for producing the backing layer (a) at least a biodegradable polyester selected from the group of lactic acid homopolymers or copolymers, preferably polylactides, polyesters of lactones with 4-10 carbon atoms, preferably polycaprolactones is suitable. Biodegradable polyesters employed with particular preference are polycaprolactones and/or polylactides.

Additionally suitable for producing the backing layer (a) are at least partly hydrolyzed polyvinyl acetates which are obtained by complete or incomplete hydrolysis of corresponding polyvinyl acetates (PVAc) and encompass not only partially hydrolyzed polyvinyl acetates having a degree of hydrolysis of 50 to 98 mol % but also fully hydrolyzed polyvinyl acetates, i.e., polyvinyl alcohols (PVOH) having a degree of hydrolysis 98%. The at least partly hydrolyzed polyvinyl acetates may optionally be used in different modifications, as for example in an amorphous state.

Also suitable for producing the backing layer (a) are ethylene-vinyl alcohol copolymers (EVOH), which are obtained by hydrolysis of corresponding ethylene-vinyl acetate copolymers (EVAc), and preferably encompass ethylene-vinyl alcohol copolymers (EVOH) having a degree of hydrolysis 98% and an ethylene fraction of 0.01-20 mol %, preferably of 0.1-10 mol %.

The backing layer (a) of the release film of the invention preferably has a layer thickness of 2 μm to 200 μm, more preferably of 4 µm to 150 µm, very preferably of 5 µm to 100 µm, more particularly of 10 µm to 80 µm.

In one preferred embodiment of the release film of the invention, the backing layer (a) is subjected to a corona pretreatment for the purpose of generating functional groups, preferably for generating radicals, preferably before the release layer (b) is applied to the backing layer (a).

Suitability for producing the release layer (b) of the release film of the invention is possessed by curable polysiloxanes.

The term "polysiloxane" in the sense of the present invention refers to compounds whose polymer chains are composed alternately of silicon atoms and oxygen atoms. A polysiloxane is based on n repeating siloxane units (—[Si($R_2$)—O]—)$_n$, which in each case independently of one another are disubstituted by two organic radicals R, where R preferably in each case stands for $R^1$ or $OR^1$, and $R^1$ in each case stands for an alkyl radical or an aryl radical. The cured polysiloxane of the invention is preferably based on a repeating dialkylsiloxane unit or on a repeating alkylarylsiloxane unit. Depending on the number of Si—O bonds in an individual siloxane unit, based in each case on a tetravalent silicon atom, these units can be distinguished as terminal monofunctional siloxanes (M) having one Si—O bond, difunctional siloxanes (D) having two Si—O bonds, trifunctional siloxanes (T) having three Si—O bonds, and tetrafunctional siloxanes (Q) having four Si—O bonds. The cured polysiloxane used in accordance with the invention preferably has a crosslinked cyclic or catenary structure, more preferably a crosslinked catenary structure, which is linked by (D), (T) and/or (Q) units to form a two- or three-dimensional network.

The number n of the repeating siloxane units [Si($R_2$)—O]—)$_n$ in the polysiloxane chain is termed the degree of polymerization of the polysiloxane.

The cured polysiloxane of the release layer (b) preferably has a degree of polymerization of 10, preferably of at least 40, more preferably of at least 100.

The release layer (b) is preferably based on at least two cured polysiloxanes which preferably differ in their degree of polymerization.

The release layer (b) is based preferably on at least one cured, i.e., crosslinked, polysiloxane selected from the group comprising addition-crosslinked, preferably metal-catalyzedly addition-crosslinked, condensation-crosslinked, free-radically crosslinked, cationically crosslinked, and moisture-exposure-crosslinked polysiloxanes.

The release layer (b) is based preferably on at least one cured polysiloxane which has been cured at least partly by the added crosslinking additive and optionally by thermal curing, by curing with electromagnetic radiation, preferably by UV radiation, or by moisture exposure.

Thermally cured polysiloxanes are obtained by thermal hydrosilylation of polysiloxanes containing silane functions with at least one compound containing a carbon double bond. In the case of the polysiloxanes cured by electromagnetic radiation, the crosslinking of the polysiloxanes has taken place by electromagnetic radiation, preferably by UV radiation. The polysiloxanes crosslinked by exposure to moisture, preferably to water, are obtained by a polycondensation reaction, in which at least one silane function and at least one alkoxy group or at least one alkoxysilane group form an Si—O bond, with elimination of at least one molecule of alcohol. Not only the polysiloxanes to be cured but also the crosslinking additives which at least partly cure the polysiloxane may in each case have the functional groups that react with one another.

Accordingly, the additive may at least partly cure the polysiloxane via functional groups selected from the group comprising functional groups containing at least one carbon double bond, preferably vinyl groups, allyl groups, (meth)acrylic acid groups, and (meth)acrylic acid derivative groups, more preferably (meth)acrylic ester groups, epoxide groups, isocyanate groups, hydroxyl groups, amine groups, amide groups, carboxyl groups, acid anhydride groups, alkoxy groups, phosphoric acid groups, phosphoric ester groups, silane groups (Si—H groups), alkoxysilane groups, preferably monoalkoxysilane, dialkoxysilane, and trialkoxysilane groups, by crosslinking with functional groups of the polysiloxane, preferably by crosslinking with functional groups of the polysiloxane that contain at least one carbon double bond, more preferably with (meth)acrylic acid derivative groups, very preferably via (meth)acrylic ester groups of the polysiloxane.

In one particularly preferred embodiment of the release film of the invention, therefore, the release layer (b) is produced using polysiloxanes which as functional groups contain (meth)acrylic acid derivative groups, more particularly (meth)acrylic ester groups.

In another preferred embodiment of the release film of the invention the release layer (b) is produced using polysiloxanes which can be cured at a temperature of <100° C., preferably <80° C., more preferably <60° C., very preferably in a range from <60° C. to 20° C.

To the skilled person here it is clear that the functional groups of the additive and of the polysiloxane that are used for crosslinking are present post-crosslinking in a modified form, i.e., in a form in which they have reacted and have been consumed by reaction.

The release layer (b) of the release film of the invention is preferably based on 0.01% to 30% by weight, preferably 0.1% to 20% by weight, more preferably 1% to 15% by weight of the crosslinked additive which promotes adhesion.

The additive used in accordance with the invention preferably has a molecular weight of not more than 5000 g/mol, more preferably of not more than 2500 g/mol, very preferably of not more than 1000 g/mol.

The additive used in accordance with the invention contains no siloxane groups but contains at least two functional groups of which at least one is a functional group containing at least one carbon double bond.

The additive used preferably has at least two, preferably at least three, crosslinking functional groups of which at least one is a functional group containing at least one carbon double bond, preferably a functional group containing at least one carbon double bond and selected from the group comprising vinyl groups, allyl groups, (meth)acrylic acid groups, and (meth)acrylic acid derivative groups, more preferably (meth)acrylic ester groups, and the further functional group or groups is or are selected from the group comprising functional group containing at least one carbon double bond and preferably selected from the group comprising vinyl groups, allyl groups, (meth)acrylic acid groups, and (meth)acrylic acid derivative groups, preferably (meth)acrylic ester groups, epoxide groups, isocyanate groups, hydroxyl groups, amine groups, amide groups, carboxyl groups, acid anhydride groups, alkoxy groups, phosphoric acid groups, phosphoric ester groups, silane groups, alkoxysilane groups, preferably monoalkoxysilane, dialkoxysilane, and trialkoxysilane groups.

The additive used has more preferably at least two, preferably at least three, functional groups, of which at least one is a functional group containing at least one carbon double bond, preferably a functional group containing at least one carbon double bond and selected from the group comprising vinyl groups, allyl groups, (meth)acrylic acid groups, and (meth)acrylic acid derivative groups, preferably (meth) acrylic ester groups, and of which the further functional group or groups is or are at least one functional group containing at least one carbon double bond, preferably a functional group containing at least one carbon double bond and selected from the group comprising vinyl groups, allyl groups, (meth)acrylic acid groups, and (meth)acrylic acid derivative groups, preferably (meth)acrylic ester groups, or is at least one silane group respectively are silane groups, or is at least one alkoxysilane group respectively are alkoxysilane groups, preferably selected from the group comprising monoalkoxysilane, dialkoxysilane, and trialkoxysilane groups, or at least one functional group(s) is/are selected from the group comprising epoxide groups, isocyanate groups, hydroxyl groups, amine groups, amide groups, phosphoric acid groups, phosphoric ester groups, carboxyl groups, and acid anhydride groups.

The additive used very preferably has at least two, preferably at least three, functional groups, of which at least one is/are a functional group containing at least one carbon double bond, preferably a functional group containing at least one carbon double bond and selected from the group comprising vinyl groups, allyl, groups, (meth)acrylic acid groups, and (meth)acrylic acid derivative groups, preferably (meth)acrylic ester groups, and of which the further functional group or groups is/are at least one functional group containing at least one carbon double bond, preferably a functional group containing at least one carbon double bond and selected from the group comprising vinyl groups, allyl groups, (meth)acrylic acid groups, and (meth)acrylic acid derivative groups, preferably (meth)acrylic ester groups, or at least one functional group(s) is/are selected from the group comprising hydroxyl groups, carboxyl groups, and acid anhydride groups.

The additive used may contain at least two different or at least two identical crosslinking functional groups.

The additive used is preferably a monomeric compound.

In one particularly preferred embodiment of the release film of the invention, the additive used contains a (meth) acrylic acid derivative group and/or a vinyl group at least as one of the at least two functional group.

The crosslinker and adhesion promoter additive is preferably selected from the group comprising di- and tri-functional acid esters, preferably di- and tri-functional (meth)acrylic esters, more preferably di- and tri-functional acrylic esters, tripropylene glycol diacrylate, triacetoxyvinylsilane, (meth)acryloyloxy-methyltrimethoxysilane, and (meth)acryloyloxypropyl-trimethoxysilane.

Some compounds of this kind are commercial products such as, for example, products from the companies Sartomer, Wacker or Siegwerk.

The additive used in accordance with the invention for possible reaction with the biodegradable polymer of the backing layer (a) preferably, after the curing of the polysiloxane of the release layer (b), still has at least one unreacted functional group, i.e., one functional group not consumed by reaction, selected from the group comprising functional group containing at least one carbon double bond, preferably vinyl groups, allyl groups, (meth)acrylic acid groups, and (meth)acrylic acid derivative groups, more preferably (meth)acrylic ester groups, epoxide groups, isocyanate groups, hydroxyl groups, amine groups, amide groups, carboxyl groups, acid anhydride groups, alkoxy groups, phosphoric acid groups, phosphoric ester groups, silane groups (Si—H groups), alkoxysilane groups, preferably monoalkoxysilane, dialkoxysilane, and trialkoxysilane groups.

The additive used in accordance with the invention for possible reaction with the biodegradable polymer of the backing layer (a) more preferably, after the curing of the polysiloxane of the release layer (b), still has at least one unreacted functional group, i.e., one functional group not consumed by reaction, selected from the group comprising hydroxyl groups, carboxyl groups, and acid anhydride groups, very preferably carboxyl groups.

The promotion of adhesion between the release layer (b) and the backing layer (a) of the release film of the invention derives from the reaction of at least one of the aforementioned functional groups of the additive with a functional group of the biodegradable polymer of the backing layer (a), preferably after corona pretreatment of the backing layer (a).

The release layer (b) of the release film of the invention preferably has a layer thickness of 5 μm, more preferably of 2 μm, very preferably of 0.1 μm to 1.5 μm.

The release film of the invention preferably has an outer release layer (b) on at least one surface.

The release film of the invention has no adhesion promoter layer between the backing layer (a) and the release layer (b), preferably not even in the laminate present as backing layer (a).

The ratio of the total layer thickness of the backing layer(s) (a) of the release film to the total layer thickness of the release layer(s) (b) is preferably in the region of at least 2:1, more preferably of at least 3:1, very preferably of at least 4:1, more particularly of at least 6:1.

The release film of the invention preferably has an elasticity modulus of 4000 N/m$^2$, preferably of 3000 N/m$^2$, more preferably of 2500 N/m$^2$ (in accordance with DIN EN ISO 527).

In one preferred embodiment, the release film of the invention has a laminate comprising the backing layer (a), which is biodegradable.

The backing layer (a) of the release film of the invention is preferably not based on paper.

In one preferred embodiment of the release film of the invention, the laminate, additionally to the backing layer (a), may have at least one substrate layer (c) based on at least one biodegradable polymer selected from the group comprising cellulose, cellulose derivatives, preferably paper, more preferably craft paper, and thermoplastic starch.

The backing layer(s) (a), the release layer (b), and/or the corresponding laminate with a substrate layer (c), may if necessary, each independently of one another, be doped with adjuvants selected from the group comprising antioxidants, antiblocking agents, antifog agents, antistats, active antimicrobial ingredients, light stabilizers, UV absorbers, UV filters, dyes, color pigments, stabilizers, preferably heat stabilizers, in-process stabilizers, and UV and/or light stabilizers, preferably based on at least one sterically hindered amine (HALS), processing assistants, flame retardants, nucleating agents, crystallizing agents, preferably crystal nucleating agents, lubricants, optical brighteners, flexibilizing agents, sealing agents, plasticizers, silanes, spacers, fillers, peel additives, waxes, wetting agents, surface-active compounds, preferably surfactants, and dispersants. For the biodegradable backing layer(s) (a), and/or of the corresponding biodegradable laminate with a substrate layer (c), these adjuvants are preferably biodegradable adjuvants. Moreover, the release effect of the release layer (b) must be retained.

The backing layer(s) (a), the release layer (b), optionally the substrate layer (c), and optionally the corresponding laminate may in each case independently of one another contain at least 0.01-30% by weight, preferably at least 0.1-20% by weight, of at least one of the aforementioned adjuvants, based in each case on the total weight of an individual layer.

The present invention further provides a method for producing the release film of the invention.

The backing layer (a) or the corresponding laminate with the substrate layer (c) of the release film of the invention may be produced by any desired production methods such as, for example, by separate extrusion or, preferably, by coextrusion.

In this case it is possible for both individual and all backing layers (a) and optionally substrate layers (c), optionally as a laminate of at least one backing layer (a) and at least one substrate layer (c), to be produced by extrusion, preferably by blown film extrusion and/or flat film extrusion (cast extrusion), or by coextrusion, preferably blown film coextrusion and/or flat film coextrusion (cast coextrusion), or by thermolamination or by lamination.

Here it should be borne in mind that, in the case of doping of the backing layer (a) or optionally of the substrate layer (c) or optionally of the laminate with at least one adjuvant, this is done by blending of the adjuvant, optionally in the form of a masterbatch, in the polymer component or components of the backing layer (a) or of the substrate layer (c), with the polymer component or components of the backing layer (a) or of the substrate layer (c). This blending may be done dry in granule/power or granule/granule form. It is also possible, however, to add the biodegradable adjuvant to the melted polymer component or components for the backing layer (a) or for the substrate layer (c), preferably by metered addition in an extruder for producing the layers.

These production methods and corresponding parameters are general knowledge to the skilled person.

The backing layer(s) (a) and optionally the substrate layers (c) or a corresponding laminate of at least one backing layer (a) and at least one substrate layer (c) may preferably be produced by blown film (co)extrusion.

It is also possible to produce the stated release film of the invention by the aforementioned extrusion methods, preferably coextrusion methods.

The backing layer (a) or a laminate comprising at least one backing layer (a) may be coated on one or on both surfaces, preferably only on one side, with a mixture of at least one uncured polysiloxane and at least one aforementioned additive, and also, optionally, adjuvants, and this mixture may be cured by exposure to heat or to electromagnetic radiation or by moisture, optionally by addition of at least one UV initiator and/or free-radical initiator to the mixture, and joined to the backing layer (a).

The release film of the invention may preferably be embossed and/or printed.

The release film of the invention is used preferably as a biodegradable, removable protective film or liner film.

The present invention therefore further provides for the use of the release film of the invention as a removable protective film, preferably for self-adhesive labels, adhesive tapes, stickers or roofing membranes.

Furthermore, the release film of the invention may also be used as a removable protective film for adhesive foods.

The release film of the invention may be used, further, as a removable liner film for the processing of adhesive resins, fibers, fabrics or other materials.

The present invention additionally provides for the use of the release film of the invention as a removable protective film for adhesive pharmaceutical products, preferably for plasters or other adhesive wound coverings, or for adhesive sanitary and hygiene products, preferably for optionally individually packaged sanitary napkins, liners or diapers.

Determination of the Release Force (Release Effect)

The release effect of the release film of the invention toward an adhesive is indicated by the release force in [cN/cm] which is needed to release, i.e., remove, the release film from the adhesive.

A test adhesive tape is adhered in this case without bubbles over the entire width of a sample of the release film of the invention or of a comparative film for which the release force is to be determined. The sample is trimmed so as to leave in each case a margin of 1 cm of release film, on the longitudinal sides of the test adhesive tape, that does not carry the test adhesive tape. The overall width of the sample is 4.5 cm (1 cm+2.5 cm+1 cm). The sample is cut into a number of strips each with a length of approximately 30 cm, and the sample strips are stored at room temperature for 15 minutes. Then the side of the test strip without the test adhesive tape is mounted by means of double-sided adhesive tape into a metal rail (350×40 mm) of an electronic rupturing device, this rail being fixed with a lower tension clamp. A stiff film strip with a length of approximately 400 mm is fastened to the test adhesive tape of the sample strip and is fixed by means of an upper tension clamp in the rupturing device. The test adhesive tape is then peeled off at an angle of 180° and at a speed of 1800 mm/min, and a force diagram is plotted in order to determine the release force. In each case an average is formed from 3 measurements.

Determination of the Adhesion of the Release Layer (b) on the Backing Layer (a)

The adhesion of the release layer (b) on the backing layer (a) of a release film is tested as follows:

A sample of a release film comprising a release layer (b) and a backing layer (a) is placed on to a smooth substrate in such a way that the release layer (b) points upward. The surface of the release layer is rubbed four to five times with the finger.

The adhesion of the release layer (b) on the backing layer (a) is assessed as follows:

Test OK (test satisfactory)=no partial (or complete) detachment of release layer (b);

Rub-off=partial (or complete) detachment of release layer (b).

The examples and comparative examples below serve to illustrate the invention, but should not be interpreted as imposing any restriction.

I. CHEMICAL CHARACTERIZATION OF THE RAW MATERIALS USED

PP: polypropylene (PP)
TPS: thermoplastic starch (TPS)
PLA: polylactide (PLA)
PCL: poly-ε-caprolactone (PCL)
KP: kraft paper
POS: mixture of
   69.0% by weight of α,ω-modified polysiloxane acrylate,
   17.0% by weight of highly pendantly modified polysiloxane acrylate, and 14.0% by weight of 1-(4-dodecylphenyl)-2-hydroxy-2-methylpropan-1-one (photoinitiator)

System 1: mixture of
66.2% by weight of α,ω-modified polysiloxane acrylate,
16.3% by weight of highly pendantly modified polysiloxane acrylate,
13.5% by weight of 1-(4-dodecylphenyl)-2-hydroxy-2-methylpropan-1-one (photoinitiator), and
4.0% by weight of additive 1

System 2: mixture of
68.7% by weight of α,ω-modified polysiloxane acrylate,
16.9% by weight of highly pendantly modified polysiloxane acrylate,
13.9% by weight of 1-(4-dodecylphenyl)-2-hydroxy-2-methylpropan-1-one (photoinitiator), and
0.5% by weight of additive 2

System 3: mixture of
60.7% by weight of α,ω-modified polysiloxane acrylate,
15.0% by weight of highly pendantly modified polysiloxane acrylate,
12.3% by weight of 1-(4-dodecylphenyl)-2-hydroxy-2-methylpropan-1-one (photoinitiator), and
12.0% by weight of additive 3

Additive 1: low molecular weight triacrylate from Sartomer
Additive 2: low molecular weight triacetoxyvinylsilane from Wacker
Additive 3: low molecular weight diacrylate from Siegwerk

II. PRODUCTION OF THE RELEASE FILMS

The release films of comparative examples 1-3 (C1-C3) and of examples 1-9 (E1-E9) consist in each case of two layers (backing layer (a) and release layer (b)) and have a total layer thickness of 50 μm in each case. The backing layers (a) were produced in each case by blown film extrusion and coated in a downstream operation with one release layer (b) each. The release films of examples 10-12 (E10-E12) consist in each case of three layers (substrate layer (c), backing layer (a), and a release layer (b)) and have a total layer thickness of 101 μm in each case. The backing layers (a) were each produced by blown film extrusion and applied by extrusion coating to one substrate layer (c) in each case. The surface of the backing layer (a) of the resulting laminate of the backing layer (a) and the substrate layer (c) was coated in a downstream operation with a release layer (b) in each case.

All of the backing layers (a) of examples C1 to C3 and E1 to E12 were corona-pretreated prior to coating with release layer (b).

III. COMPARATIVE EXAMPLES

All % figures below are % by weight in each case.

Comparative Example 1 (C1)

Backing layer (a) (49 μm): 100% PLA
Release layer (b) (1 μm): 100% POS

Comparative Example 2 (C2)

Backing layer (a) (49 μm): 100% TPS
Release layer (b) (1 μm): 100% POS

Comparative Example 3 (C3)

Backing layer (a) (49 μm): 100% PCL
Release layer (b) (1 μm): 100% POS

IV. EXAMPLES

All % figures below are % by weight in each case.

Example 1 (E1)

Backing layer (a) (49 μm): 100% PLA
Release layer (b) (1 μm): 100% system 1

Example 2 (E2)

Backing layer (a) (49 μm): 100% PLA
Release layer (b) (1 μm): 100% system 2

Example 3 (E3)

Backing layer (a) (49 μm): 100% PLA
Release layer (b) (1 μm): 100% system 3

Example 4 (E4)

Backing layer (a) (49 μm): 100% TPS
Release layer (b) (1 μm): 100% system 1

Example 5 (E5)

Backing layer (a) (49 μm): 100% TPS
Release layer (b) (1 μm): 100% system 2

Example 6 (E6)

Backing layer (a) (49 μm): 100% TPS
Release layer (b) (1 μm): 100% system 3

Example 7 (E7)

Backing layer (a) (49 μm): 100% PCL
Release layer (b) (1 μm): 100% system 1

Example 8 (E8)

Backing layer (a) (49 μm): 100% PCL
Release layer (b) (1 μm): 100% system 2

Example 9 (E9)

Backing layer (a) (49 μm): 100% PCL
Release layer (b) (1 μm): 100% system 3

Example 10 (E10)

Substrate layer (c) (80 μm): 100% KP
Backing layer (a) (20 μm): 100% PLA
Release layer (b) (1 μm): 100% system 1

Example 11 (E11)

Substrate layer (c) (80 μm): 100% KP
Backing layer (a) (20 μm): 100% PLA
Release layer (b) (1 μm): 100% system 2

Example 12 (E12)

Substrate layer (c) (80 µm): 100% KP
Backing layer (a) (20 µm): 100% PLA
Release layer (b) (1 µm): 100% system 3

V. DETERMINATION OF THE RELEASE FORCE/ADHESION

For all of the release films of examples 1-12 (E1-E12) and of comparative examples 1-3 (C1-C3) the release force needed to remove the release film from a test adhesive tape (for C1-C3 and E1-E12) was determined in each case in accordance with the method described above. Furthermore, the method described above was used to test the adhesion of the release layer (b) on the backing layer (a) of the release film (for C1-C3 and E1-E12).

| Example | Release force (cN/cm) | Adhesion of release layer (b) on backing layer (a) |
|---|---|---|
| C1 | 7.1 | Rub off |
| C2 | 8.2 | Rub off |
| C3 | 7.2 | Rub off |
| E1 | 7.1 | Test OK |
| E2 | 6.6 | Test OK |
| E3 | 7.9 | Test OK |
| E4 | 6.1 | Test OK |
| E5 | 6.2 | Test OK |
| E6 | 7.9 | Test OK |
| E7 | 5.9 | Test OK |
| E8 | 5.5 | Test OK |
| E9 | 6.1 | Test OK |
| E10 | 7.2 | Test OK |
| E11 | 8.1 | Test OK |
| E12 | 8.0 | Test OK |

Test OK=test satisfactory (no rub-off)

The release films of the invention (examples E1 to E12) which have a release layer (b) based on at least one polysiloxane cured with a crosslinking additive have the required release force in the range from 5 to 10 cN/cm and, furthermore, exhibit no rub-off in comparison to the release films of comparative examples C1-C3.

VI. BIODEGRADABILITY

The backing layers (a) of the release films of the invention from examples E1-E12 are biodegradable in accordance with DIN EN 13432: that is, within the method described above for determining the biodegradability and the disintegration test, the backing layers (a) of these release films were degraded to an extent of at least 90% after 12 weeks.

The invention claimed is:

1. A two-layer, more than 50% by weight biodegradable removable protective film or liner film consisting of
   (a) one backing layer based on at least one biodegradable polymer selected from the group consisting of lactic acid homopolymers, lactic acid copolymers, polylactides, polyhydroxyalkanoates, thermoplastic starch, polyester, at least partly hydrolyzed polyvinyl acetates, ethylene-vinyl alcohol copolymers, copolymers of at least two monomers of the stated polymers, and mixtures of at least two of the stated polymers and
   (b) one release layer based on at least one cured polysiloxane which curing is based at least partly on a reaction with at least one crosslinking monomeric or oligomeric additive,
   said additive also causing the adhesion between the backing layer (a) and the release layer (b), and no adhesion layer is present between the backing layer (a) and the release layer (b), whereby
   the additive used contains no siloxane groups, and
   has at least two functional groups of which at least one is a functional group containing at least one carbon double bond and
   at least one functional group not consumed by the curing of the polysiloxane causing said adhesion promotion between the backing layer (a) and the release layer (b), which is selected from the group consisting of hydroxyl groups, carboxyl groups, and acid anhydride groups.

2. The removable protective film or liner film as claimed in claim 1, wherein the cured polysiloxane has a degree of polymerization of ≥10.

3. The removable protective film or liner film as claimed in claim 1, wherein said cured polysiloxane comprises at least one cured polysiloxane which is cured via functional groups of the polysiloxane, at least partly by crosslinking with at least one functional group of the additive that is selected from the group consisting of functional groups containing at least one carbon double bond, epoxide groups, isocyanate groups, hydroxyl groups, amine groups, amide groups, carboxyl groups, acid anhydride groups, alkoxy groups, phosphoric acid groups, phosphoric ester groups, silane groups, and alkoxysilane groups.

4. The removable protective film or liner film as claimed in claim 1, wherein said cured polysiloxane comprises at least two cured polysiloxanes.

5. The removable protective film or liner film as claimed in claim 1, wherein the release layer (b) is based on 0.01% to 30% by weight of the crosslinking additive which promotes adhesion.

6. The removable protective film or liner film as claimed in claim 1, wherein the additive used has a molecular weight of not more than 5000 g/mol.

7. The removable protective film or liner film as claimed in claim 1, wherein the additive used has at least two crosslinking functional groups of which at least one is a functional group containing at least one carbon double bond, and the further crosslinking functional group or groups is or are selected from the group consisting of functional groups containing at least one carbon double bond, epoxide groups, isocyanate groups, hydroxyl groups, amine groups, amide groups, carboxyl groups, acid anhydride groups, alkoxy groups, phosphoric acid groups, phosphoric ester groups, silane groups, and alkoxysilane groups.

8. The removable protective film or liner film as claimed in claim 1, wherein the additive used has at least two crosslinking functional groups, and at least one of these functional groups
   is a crosslinking functional group containing at least one carbon double bond and selected from the group consisting of (meth)acrylic acid groups, vinyl groups, allyl groups, and (meth)acrylic acid derivative groups,
   and at least one further functional group
   is a crosslinking functional group containing at least one carbon double bond and selected from the group consisting of (meth)acrylic acid groups, vinyl groups, allyl groups, and (meth)acrylic acid derivative groups,
   or is a silane group,
   or is an alkoxysilane group,
   or is a functional group selected from the group consisting of epoxide groups, isocyanate groups, hydroxyl groups, amine groups, amide groups, carboxyl groups, and acid anhydride groups.

9. The removable protective film or liner film as claimed in claim 1, wherein the adhesion of the release layer (b) and the backing layer (a) is promoted by reaction of at least one functional group of the additive with at least one functional group of the biodegradable polymer of the backing layer (a).

10. The removable protective film or liner film as claimed in claim 1, wherein the additive used is a monomeric compound.

11. The removable protective film or liner film as claimed in claim 1, having a release layer (b) on one surface of said backing layer (a).

12. The removable protective film or liner film as claimed in claim 1, wherein said at least one functional group not consumed by the curing of the polysiloxane is selected from the group consisting of vinyl groups, allyl groups, (meth) acrylic acid groups, and (meth)acrylic acid derivative groups, epoxide groups, isocyanate groups, amine groups, amide groups, alkoxy groups, phosphoric acid groups, phosphoric ester groups, silane groups (Si—H groups), and alkoxysilane groups.

13. A multi-layer, more than 50% by weight biodegradable removable protective film or liner film consisting of (a) one backing layer based on at least one biodegradable polymer selected from the group consisting of lactic acid homopolymers, lactic acid copolymers, polylactides, polyhydroxyalkanoates, thermoplastic starch, polyester, at least partly hydrolyzed polyvinyl acetates, ethylene-vinyl alcohol copolymers, copolymers of at least two monomers of the stated polymers, and mixtures of at least two of the stated polymers and (b) one release layer based on at least one cured polysiloxane which curing is based at least partly on a reaction with at least one crosslinking monomeric or oligomeric additive, said additive also causing the adhesion between the backing layer (a) and the release layer (b), with the consequence that no separate adhesion promoting layer is present between the backing layer (a) and the release layer (b), whereby the additive used contains no siloxane groups, has at least two functional groups of which at least one is a functional group containing at least one carbon double bond, and at least one functional group not consumed by the curing of the polysiloxane causing said adhesion promotion between the backing layer (a) and the release layer (b), which is selected from the group consisting of hydroxyl groups, carboxyl groups, and acid anhydride groups, (c) and having at least one further substrate layer (c) based on at least one biodegradable polymer selected from the group consisting of cellulose, cellulose derivatives, paper, and thermoplastic starch.

14. A method for producing the multilayer removable protective film or liner film as claimed in claim 13, comprising co-extruding or producing by lamination the backing layer (a) or a laminate of at least one backing layer (a) and at least one substrate layer (c), subsequently coating the backing layer (a) or a laminate comprising at least the backing layer (a) coated on at least one surface with the release layer (b) based on a mixture of at least one uncured polysiloxane and at least one crosslinker and adhesion promoter additive, and curing this mixture by exposure to heat or electromagnetic radiation or by moisture, optionally by addition of at least one UV initiator and/or free-radical initiator, and joining to the backing layer (a).

15. A method of protecting a substrate comprising covering a portion of the substrate to be protected with the removable protective film or liner film as claimed in claim 13.

16. A method of protecting adhesive foods comprising covering the adhesive foods with the removable protective film or liner film as claimed in claim 13.

17. A method of lining during the processing of adhesive resins, fibers, fabrics or other materials, comprising lining the resins, fibers, fabrics or other materials with the removable protective film or liner film as claimed in claim 13.

18. A method of protecting adhesive pharmaceutical products, or adhesive sanitary and hygiene products, comprising covering the products with the removable protective film or liner film as claimed in claim 13.

* * * * *